(12) United States Patent
Andersen

(10) Patent No.: US 6,235,262 B1
(45) Date of Patent: May 22, 2001

(54) PROCESS FOR THE COMBINED PRODUCTION OF HYDROGEN RICH GAS AND ELECTRICAL POWER

(75) Inventor: Henrik Solgaard Andersen, Søborg (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/292,353

(22) Filed: Apr. 15, 1999

Related U.S. Application Data

(60) Provisional application No. 60/081,925, filed on Apr. 16, 1998.

(51) Int. Cl.$^7$ .............................. C01B 3/24; C01B 3/26
(52) U.S. Cl. ........................ 423/650; 252/373; 423/652
(58) Field of Search ..................... 252/373; 423/652, 423/650

(56) References Cited

U.S. PATENT DOCUMENTS

| | | | |
|---|---|---|---|
| 4,725,381 | * | 2/1988 | Pinto ...................................... 423/359 |
| 4,822,521 | * | 4/1989 | Fuderer ................................ 252/373 |
| 5,740,667 | * | 4/1998 | Bhattacharyya et al. ............ 252/373 |
| 6,025,403 | * | 2/2000 | Marler et al. ........................ 252/373 |

OTHER PUBLICATIONS

John H. Perry's *Chemical Engineers' Handbook*, Fourth Edition (1963), McGraw–Hill Book Co., pp. 24–74 through 24–76; (No Month).*

* cited by examiner

*Primary Examiner*—Wayne Langel
(74) *Attorney, Agent, or Firm*—Ostrolenk, Faber, Gerb & Soffen, LLP

(57) ABSTRACT

A process for the production of hydrogen rich gas by soot free autothermal steam reforming of a hydrogen process gas, wherein the hydrogen rich gas being withdrawn from the autothermal steam reforming process at elevated pressure is depressurized in a gas turbine for generation of valuable power.

1 Claim, 1 Drawing Sheet

PROCESS FOR THE COMBINED PRODUCTION OF HYDROGEN RICH GAS AND ELECTRICAL POWER

This application claims the benefit of U.S. Provisional application No. 60/081,925, filed on Apr. 16, 1998.

BACKGROUND OF THE INVENTION

1. Field of the Invention

The present invention relates to the production of hydrogen rich gas by autothermal steam reforming of a hydrocarbon process gas, wherein the hydrogen rich gas being withdrawn from the autothermal steam reforming process at elevated pressure is depressurized in a gas turbine for generation of valuable power.

2. Description of the Related Art

Autothermal steam reforming is a well-known process for the preparation of hydrogen rich synthesis gas. The process is conventionally performed in a combustion reactor with a top combustion zone, and a bottom catalyst zone. In the combustion zone, hydrocarbon feedstock is partially oxidized with an oxygen-containing atmosphere. Partially oxidized effluent from the combustion zone is subsequently subjected to steam reforming in the presence of a steam reforming catalyst arranged in fixed bed manner in the bottom part of the reactor. Typical operation conditions in the above process are 850° C. and 2–4 MPa at steam to carbon ratios above 1, depending on the desired product gas.

A problem with autothermal steam reforming is formation of soot in the substoichiometric combustion of hydrocarbons. In particular, at low steam/carbon ratios in the feed gas to the autothermal reformer, soot is formed markedly in the combustion zone.

In a number of industrial applications, a low steam to carbon ratio is required in the feed gas. Thus, in the manufacture of synthesis gas, steam to carbon ratios below 1 are advantageous to obtain the optimum hydrogen to carbon monoxide ratio in the product gas.

Several attempts to reduce soot formation at low steam to carbon ratios in autothermal reforming have been made in the past, including specific burner designs and control of operation conditions.

In co-pending European Patent Application No. 99102386, a process for soot free autothermal catalytic steam reforming is described, wherein formation of soot is avoided by controlling the operation pressure within a certain range depending on the adiabatic gas temperature of the reformed feed stock and the steam to carbon ratio. It was, furthermore, found that operation pressures above 3.5 MPa allow soot free reforming at a very low steam to carbon ratio.

The disadvantages of operating at high operation pressure in the autothermal steam reforming process are the expense involved in compressing the feed gas and the pressure of produced synthesis gas, which, for applications in subsequent process units, will be typically required at a lower pressure.

SUMMARY OF THE INVENTION

It has now been found that substantial amounts of energy used in the compression of feed gas to an autothermal reformer operating without formation of soot at low steam/carbon ratios are regained when the synthesis gas being withdrawn from the reformer at high pressure is depressurized in a turbine, as the autothermal reformer combined with the turbine constitute a gas turbine generating power.

Accordingly, the present invention provides a process for the production of hydrogen rich gas by soot free autothermal steam reforming of a hydrocarbon process gas, wherein the hydrogen rich gas being withdrawn from the autothermal steam reforming process at an elevated pressure is depressurized in a gas turbine for generation of valuable power.

Other features and advantages of the present invention will become apparent from the following description of the invention which refers to the accompanying drawings.

DETAILED DESCRIPTION OF THE PREFERRED EMBODIMENT

Figure 1:
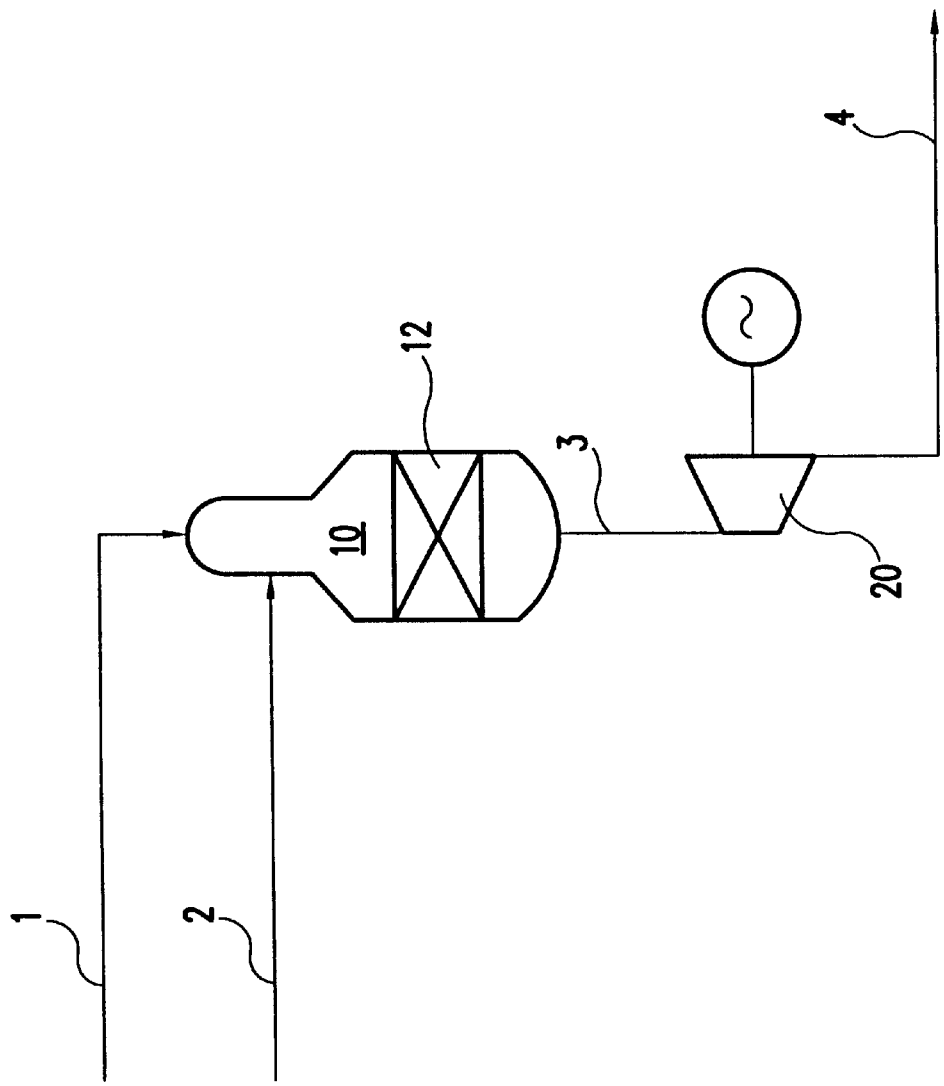
FIG. 1 shows the process flow of the preferred embodiment of the present invention.

A specific embodiment of the invention is shown schematically in FIG. 1.

In the process as shown in FIG. 1, process gas 2 and oxidant 1 are introduced into autothermal steam reformer 10, with a fixed bed of conventional autothermal steam reforming catalyst 12. The process gas is autothermal steam reformed in reformer 10 at conventional conditions and a hydrogen rich gas is withdrawn from the reformer in line 3.

Line 3 is connected to gas turbine 20. In gas turbine 20, the hydrogen rich gas from reformer 10 is depressurized, thereby driving turbine 20 and rotational shaft power is transformed to electrical power.

Having transferred energy, the depressurized gas is then withdrawn in line 4.

The flow, pressure, and temperature of the above-described gas streams and compositions of the streams are summarized in the table below.

TABLE

|  | Stream No. | | | |
| --- | --- | --- | --- | --- |
|  | 1 | 2 | 3 | 4 |
| Flow, Nm³/h | 80,119 | 148,316 | 297,404 | 297,404 |
| Pressure, Kg/cm²g | 76.5 | 75.5 | 73.5 | 33.0 |
| Temperature, ° C. | 550 | 535 | 1048 | 881 |
| Composition, mole % | | | | |
| $H_2$ | — | 1.43 | 32.63 | 32.63 |
| $N_2$ | 56.62 | 0.93 | 15.49 | 15.49 |
| $O_2$ | 40.53 | — | — | — |
| $H_2O$ | 2.08 | 66.59 | 33.21 | 33.21 |
| $CH_4$ | — | 26.32 | 0.40 | 0.40 |
| $C_2$ | — | 2.73 | — | — |
| CO | — | — | 11.72 | 11.72 |
| $CO_2$ | 0.02 | 1.99 | 6.34 | 6.34 |
| Ar | 0.75 | 0.01 | 0.21 | 0.21 |

Gas turbine power: 23.3 MW

As is apparent from the above table, at the condition disclosed, 23.3 MW power are produced in the gas turbine.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A process for the production of hydrogen-rich gas by autothermal steam reforming of a hydrocarbon process gas introduced under elevated pressure into said autothermal reforming, wherein soot formation is suppressed by steam reforming the hydrocarbon process gas at a pressure of at least 3 MPa and at a steam/carbon ratio below 1, depressurizing the hydrogen-rich gas withdrawn from the autothermal steam reforming step in a gas turbine for the generation of power, and withdrawing the hydrogen rich gas from the turbine.

* * * * *